United States Patent
Leise et al.

(10) Patent No.: US 10,853,882 B1
(45) Date of Patent: Dec. 1, 2020

(54) METHOD AND SYSTEM FOR ANALYZING LIABILITY AFTER A VEHICLE CRASH USING VIDEO TAKEN FROM THE SCENE OF THE CRASH

(71) Applicant: STATE FARM MUTUAL AUTOMOBILE INSURANCE COMPANY, Bloomington, IL (US)

(72) Inventors: William J. Leise, Normal, IL (US); Douglas Albert Graff, Mountain View, MO (US); Christina P. Mullen, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 641 days.

(21) Appl. No.: 15/054,309

(22) Filed: Feb. 26, 2016

(51) Int. Cl.
| | |
|---|---|
| *G06Q 40/08* | (2012.01) |
| *G06K 9/00* | (2006.01) |
| *G06T 5/50* | (2006.01) |
| *G06K 9/62* | (2006.01) |
| *G06T 7/00* | (2017.01) |

(52) U.S. Cl.
CPC .......... *G06Q 40/08* (2013.01); *G06K 9/00711* (2013.01); *G06K 9/6202* (2013.01); *G06K 9/6267* (2013.01); *G06T 5/50* (2013.01); *G06T 7/004* (2013.01); *G06T 2207/10016* (2013.01); *G06T 2207/30252* (2013.01)

(58) Field of Classification Search
CPC ............................................... G06Q 40/00–08
See application file for complete search history.

(56) References Cited

U.S. PATENT DOCUMENTS

| | | | | |
|---|---|---|---|---|
| 7,912,740 | B2 * | 3/2011 | Vahidi | G06Q 10/10 705/4 |
| 8,204,766 | B2 * | 6/2012 | Bush | G06Q 20/10 705/2 |
| 8,620,698 | B2 * | 12/2013 | Hu | G06F 19/328 705/4 |
| 8,989,696 | B1 * | 3/2015 | Cona | G08G 1/096741 455/404.1 |
| 9,256,991 | B2 * | 2/2016 | Crawford | G06Q 40/08 |
| 9,262,787 | B2 | 2/2016 | Binion et al. | |
| 9,852,636 | B2 * | 12/2017 | Chow | G08G 1/20 |
| 9,942,526 | B2 * | 4/2018 | Plante | H04N 5/23206 |
| 9,984,331 | B2 * | 5/2018 | Cama | G08G 1/0141 |

(Continued)

OTHER PUBLICATIONS

U.S. Appl. No. 14/798,741, filed Jul. 14, 2015.
U.S. Appl. No. 14/798,745, filed Jul. 14, 2015.

*Primary Examiner* — Narayanswamy Subramanian
(74) *Attorney, Agent, or Firm* — Marshall, Gerstein & Borun LLP

(57) ABSTRACT

A method and system may analyze the liability of drivers involved in a vehicle crash based on video image data of the vehicle crash. When a vehicle crash occurs, several image capturing devices may transmit sets of video images captured within a predetermined threshold distance and time of the scene of the vehicle crash. The sets of video images may be combined, aggregated, and/or assembled chronologically and spatially to form a compilation which may depict the sequence of events leading up to, during, and immediately after the vehicle crash. Based on the compilation, percentages of fault may be allocated to each of the drivers involved in the vehicle crash and the amount of liability may be assessed for each of the drivers.

17 Claims, 6 Drawing Sheets

(56) References Cited

U.S. PATENT DOCUMENTS

| | | | | |
|---|---|---|---|---|
| 2003/0046003 | A1* | 3/2003 | Smith | G01C 15/00 701/32.2 |
| 2005/0171663 | A1* | 8/2005 | Mittelsteadt | G06Q 40/08 701/32.6 |
| 2006/0155616 | A1* | 7/2006 | Moore | G06Q 10/0875 705/30 |
| 2006/0195384 | A1* | 8/2006 | Bauer | G06Q 30/06 705/37 |
| 2008/0252485 | A1* | 10/2008 | Lagassey | G07C 5/008 340/907 |
| 2010/0030540 | A1* | 2/2010 | Choi | G01S 5/0027 703/8 |
| 2010/0085431 | A1* | 4/2010 | Trapani | G08B 13/19647 348/148 |
| 2010/0157061 | A1* | 6/2010 | Katsman | G07C 5/008 348/149 |
| 2011/0211070 | A1* | 9/2011 | Shu | H04N 21/2187 348/143 |
| 2011/0238997 | A1* | 9/2011 | Bellur | H04L 63/1458 713/176 |
| 2012/0109447 | A1* | 5/2012 | Yousefi | H04L 47/6275 701/32.2 |
| 2013/0030642 | A1* | 1/2013 | Bradley | G07C 5/008 701/32.2 |
| 2013/0226758 | A1* | 8/2013 | Reitan | G06Q 40/00 705/35 |
| 2013/0302758 | A1* | 11/2013 | Wright | G07C 5/008 434/65 |
| 2014/0300739 | A1* | 10/2014 | Mimar | G08B 21/06 348/148 |
| 2015/0161738 | A1* | 6/2015 | Stempora | G06Q 40/08 705/4 |
| 2015/0262486 | A1* | 9/2015 | Bahl | G08G 1/164 701/301 |
| 2015/0317801 | A1* | 11/2015 | Bentley | G08B 21/043 382/107 |
| 2015/0324636 | A1* | 11/2015 | Bentley | A63F 13/00 386/227 |
| 2015/0339777 | A1* | 11/2015 | Zhalov | G06Q 40/08 705/4 |
| 2016/0163124 | A1* | 6/2016 | Crawford | G07C 5/00 701/29.1 |
| 2016/0264255 | A1* | 9/2016 | Connor | G07C 5/0866 |
| 2016/0275790 | A1* | 9/2016 | Kang | G07C 5/0866 |
| 2017/0076394 | A1* | 3/2017 | Manweiler | G07C 5/085 |
| 2017/0228948 | A1* | 8/2017 | Albitz | G07C 5/0841 |

* cited by examiner

METHOD AND SYSTEM FOR ANALYZING LIABILITY AFTER A VEHICLE CRASH USING VIDEO TAKEN FROM THE SCENE OF THE CRASH

TECHNICAL FIELD

The present disclosure generally relates to systems and methods for assessing liability after a vehicle crash and, more particularly to identifying injuries to occupants of vehicles involved in the vehicle crash and determining an amount of fault attributed to each driver in the vehicle crash based on video taken from the scene.

BACKGROUND

Today, allocating fault for a vehicle crash may involve collecting first- or second-hand eyewitness reports (e.g., police reports). Unfortunately, eyewitness reports can be inaccurate and/or biased, and can only be obtained after considerable delay. Moreover, other types of evidence typically used to corroborate or supplement eyewitness reports, such as analyses of the damage resulting from the crash or photographs of the scene of the crash long after the crash occurred, could provide very limited amounts of additional information and, like the eyewitness reports, only become available after a long delay. As a result, the party at fault for the crash could be incorrectly identified. Inaccurate assessments of fault may lead to challenges and inefficiencies in the insurance marketplace, and lengthy delays may prevent insurance providers from quickly resolving claims, or taking other actions designed to benefit the policyholder.

SUMMARY

To analyze liability after a vehicle crash, a liability assessment system may obtain one or several sets of video images of the scene of the vehicle crash captured within a predetermined threshold time (e.g., two minutes) from the time of the vehicle crash. The sets of video images may be captured from public surveillance cameras, satellites, portable computing devices such as smart phones of users at or around the scene of the crash, image capturing devices externally attached to the vehicles involved in the crash, drones, or other vehicles at or around the scene of the crash (e.g., monopods), or any other suitable image capturing device. The sets of video images may be combined, aggregated, and/or assembled chronologically and spatially to form a compilation, which may be used to assess liability or may be used as a tool to aid in the assessment of liability. The compilation may also be used to identify or predict injuries to occupants of the vehicles. Based on the compilation, the liability assessment system may determine impact characteristics for each of the vehicles involved in the vehicle crash. The impact characteristics may be analyzed to determine fault characteristics for each of the drivers of the vehicles, such as the extent to which each driver is at fault for the vehicle crash. In some scenarios, one of the drivers may be wholly responsible for the vehicle crash while the other driver(s) is not at fault at all. In other scenarios, both drivers may be partially at fault for the vehicle crash (e.g., Driver A is 60 percent at fault while Driver B is 40 percent, Driver A is 80 percent at fault while Driver B is 20 percent, etc.), or neither of the drivers may be at fault for the vehicle crash. The amount of damage to each of the vehicles involved in the vehicle crash may also be determined based on the compilation.

Additionally, the liability assessment system may identify or predict injuries to occupants of the vehicles and/or pedestrians involved in the crash and the extent of the injuries based on the compilation. If the extent of an injury exceeds a predetermined threshold severity (e.g., a passenger falls out of the vehicle onto the pavement), the liability assessment system may transmit an alert to emergency personnel to provide emergency assistance at the location of the vehicle crash.

In this manner, accident liability may be determined or adjusted based on a representation of the actual event as it occurs as opposed to a re-creation or virtual rendering of the vehicle crash based on potentially unreliable or misleading reports and data. By receiving several sets of video images of the scene of the vehicle crash from multiple image capturing devices, the present embodiments advantageously allow for a complete representation of the scene of the vehicle crash increasing the accuracy in determining fault. This may include multiple angles and locations of the vehicles leading up to, during, and immediately after the vehicle crash. Moreover, injuries may be identified and emergency personnel may be notified in real-time; which may allow for a fast and efficient response to the vehicle crash.

In an embodiment, a computer-implemented method for analyzing liability in a vehicle crash using video image data is provided. The method includes receiving an indication of a location and time of a vehicle crash, receiving a plurality of sets of video images captured for an area within a predetermined threshold distance of the location of the vehicle crash and within a predetermined threshold time from the time of the vehicle crash from one or more image capturing devices external to one or more vehicles involved in the vehicle crash, and combining the plurality of sets of video images that depict the vehicle spatially and chronologically to generate a compilation, wherein the compilation depicts a sequence of events leading up to, during, and after the vehicle crash as the sequence of events actually occurred. The method further includes analyzing the compilation to determine one or more fault characteristics of the vehicle crash, assessing liability for one or more drivers of the one or more vehicles involved in the vehicle crash based on the fault characteristics, and causing indications of the assessed liabilities for the one or more drivers to be displayed on a user interface.

In another embodiment, a system for analyzing liability in a vehicle crash using video image data is provided. The system includes one or more processors, a communication network and a non-transitory computer-readable memory coupled to the one or more processors, and the communication network and storing instructions thereon. When executed by the one or more processors, the instructions cause the system to receive, via the communication network, an indication of a location and time of a vehicle crash, receive, via the communication network, a plurality of sets of video images captured for an area within a predetermined threshold distance of the location of the vehicle crash and within a predetermined threshold time from the time of the vehicle crash from one or more image capturing devices external to one or more vehicles involved in the vehicle crash, and combine the plurality of sets of video images that depict the vehicle spatially and chronologically to generate a compilation, wherein the compilation depicts a sequence of events leading up to, during, and after the vehicle crash as the sequence of events actually occurred. The instructions further cause the system to analyze the video images to determine one or more fault characteristics of the vehicle crash, assess liability for one or more drivers of the one or more vehicles involved in the vehicle crash based on the fault characteristics and cause, via the communication network, indications of the assessed liabilities for the one or more drivers to be displayed on a user interface.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1:
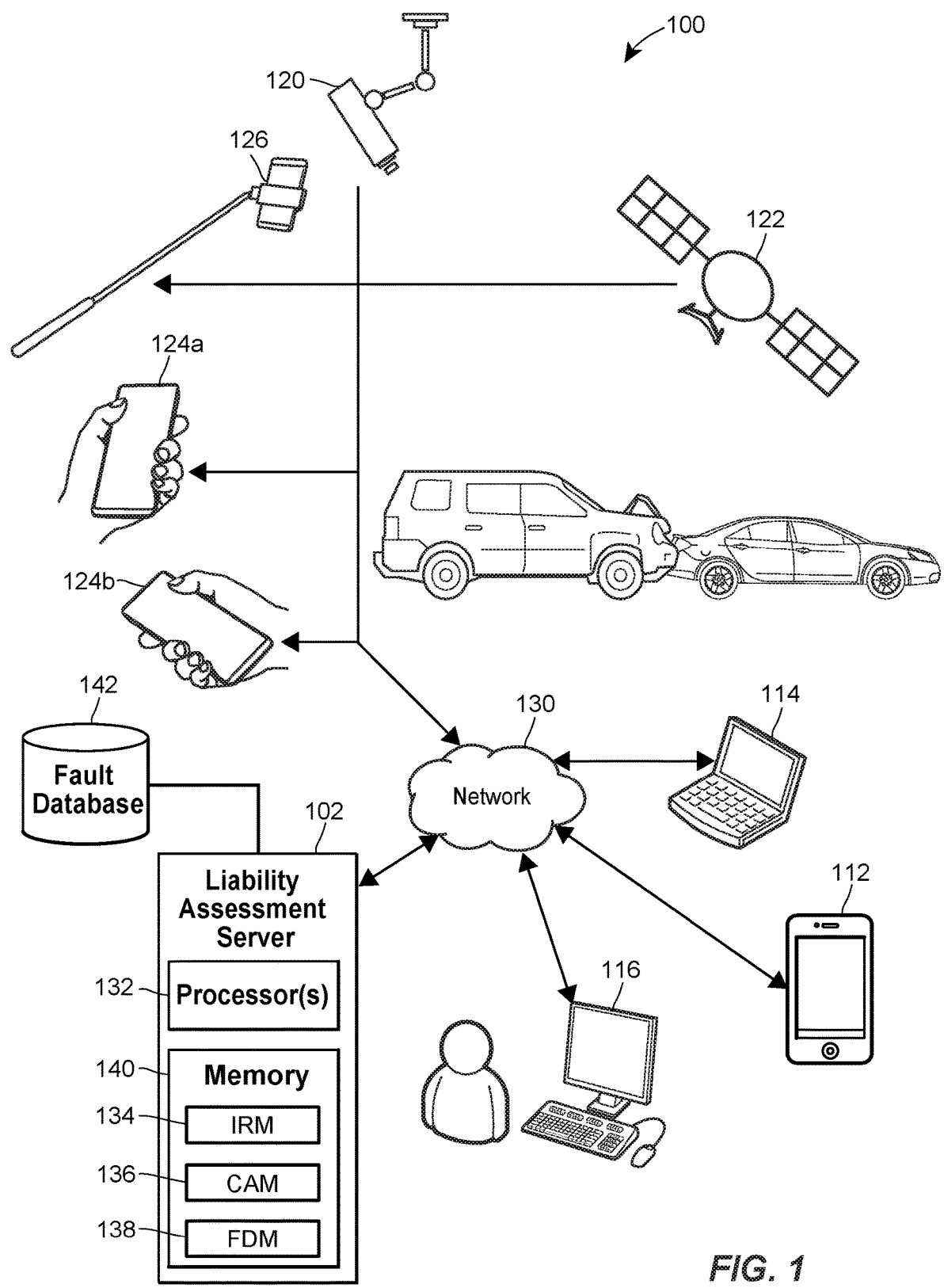
FIG. 1 illustrates a block diagram of a computer network and system on which an exemplary liability assessment system may operate in accordance with the presently described embodiments.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Accordingly, as used herein, the term "insurance policy," as used herein, generally refers to a contract between an insurer and an insured. In exchange for payments from the insured, the insurer pays for damages to the insured that are caused by covered perils, acts or events as specified by the language of the insurance policy. The payments from the insured are generally referred to as "premiums," and typically are paid on behalf of the insured upon purchase of the insurance policy or over time at periodic intervals. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when the parameters of the insurance policy have expired, when premium payments are not being paid, when a cash value of a policy falls below an amount specified in the policy, or if the insured or the insurer cancels the policy.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

The terms "insured," "insured party," "policyholder," and "customer," are used interchangeably herein to refer to a person, party, or entity (e.g., a business or other organizational entity) that is covered by the insurance policy, e.g., whose insured article or entity (e.g., property, life, health, auto, home, business) is covered by the policy. Generally, the term "user" is used when referring to a person who is operating a client device and is not exclusive of the terms "customer," "insured," "insured party," and "policy holder."

The term "vehicle crash" may refer to any collision between a vehicle and another vehicle, pedestrian, animal, road hardware, road debris, or other object. For example, a vehicle crash may include a rear-end collision, a head-on collision, broadside collision, etc., between two or more vehicles.

The term "video frame" may refer to one of many still images which compose a complete moving picture. For example, each video frame may be flashed on a display screen for a short period of time (e.g., 0.01 seconds) and then replaced by the next video frame. In other examples, 24, 25, 30, 48, or 60 video frames may be displayed per second or any other suitable number.

The term "a set of video images" may refer to a recording of moving visual images for a duration. For example, a set of video images may depict the scene of a vehicle crash starting at 20 seconds before the vehicle crash and ending 10 seconds after the vehicle crash.

As used herein, the term "vehicle" may refer to any of a number of motorized transportation devices. A vehicle may be a car, truck, bus, train, boat, plane, motorcycle, snowmobile, other personal transport devices, etc. Also as used herein, the term "autonomous vehicle" means a vehicle including one or more automated operation features capable of operating the vehicle in the absence of or without operating input from a vehicle operator. A "semi-autonomous vehicle" means a vehicle with one or more automated operation features capable of operating the vehicle without operating input from a vehicle operator and one or more manual operation features that require operating input from a vehicle operator.

The term "real-time" as used herein, may be used to refer to information delivered within a predetermined amount of time after it is collected (e.g., seconds, minutes, hours, etc.). For example, a set of video images which is received and analyzed to generate a compilation and assess liability or aid in the assessment of liability within a short period of time after it is recorded may be referred to herein as received and analyzed in "real-time." The term "near real-time" as used herein, may be used to refer to information delivered within a predetermined amount of time after real-time. For example, a set of video images may be received and analyzed in "near real-time" when there is a processing delay between the time the set of video images is recorded and the time the set of video images is analyzed (e.g., one minute, five minutes, twenty minutes, an hour, etc.).

Generally speaking, techniques for analyzing liability or aiding in the assessment of liability in a vehicle crash may be implemented in a client device, one or several network servers, one or several image capturing devices or a system that includes a combination of these devices. However, for clarity, the examples below focus primarily on an embodiment in which a liability assessment server receives several sets of video images of the scene of a vehicle crash from several image capturing devices. For example, the image capturing devices may include public surveillance cameras, satellites, portable computing devices such as smart phones of users at or around the scene of the crash, image capturing devices externally attached to the vehicles involved in the crash or other vehicles at or around the scene of the crash (e.g., monopods), or any other suitable image capturing device. Each set of video images may depict at least one of the vehicles involved in the crash.

The liability assessment server may then combine, aggregate, and/or assemble the several sets of video images spatially and chronologically to generate a compilation depicting the scene of the vehicle crash. Furthermore, the liability assessment module may assess or adjust the liability of each of the drivers involved in the vehicle crash based on the compilation and transmit indications of the amount each of the drivers is at fault in the vehicle crash to an insurance representative's computing device for display on a user interface. In some embodiments, the computing device may display a percentage of fault for each driver and a total amount of damage to each of the vehicles as well as the amount of injuries to vehicle occupants and pedestrians involved in the vehicle crash. Also in some embodiments, one or more of the vehicles involved in the vehicle crash may be autonomous vehicles and may be operated without input from a human driver. In such an embodiment, liability may be assessed for the manufacturer of the autonomous vehicle or the manufacturer of the autonomous operation features rather than a driver.

Referring to FIG. 1, an example liability assessment system 100 in which the techniques outlined above can be implemented includes a liability assessment server 102, a plurality of image capturing devices 120-126, and a plurality of client devices 112-116 which may be communicatively connected through a network 130, as described below. According to embodiments, the liability assessment server 102 may be a combination of hardware and software components, also as described in more detail below. The liability assessment server 102 may have an associated fault database 124 for storing fault allocation data related to the operation of the liability assessment system 100. Moreover, the liability assessment server 102 may include one or more processor(s) 132 such as a microprocessor coupled to a memory 140.

The memory 140 may be tangible, non-transitory memory and may include any types of suitable memory modules, including random access memory (RAM), read-only memory (ROM), flash memory, other types of persistent memory, etc. The memory 140 may store, for example instructions executable on the processors 132 for an image receiving/reconstruction module (IRM) 134, a crash analysis module (CAM) 136, and a fault determination module (FDM) 138. The liability assessment server 102 is described in more detail below with reference to FIG. 2A.

To assess or adjust the liability of drivers involved in a vehicle crash, an image receiving/reconstruction module 134 may obtain several sets of video images from several image capturing devices 120-126 external to the vehicles involved in the vehicle crash. The sets of video images may depict the scene of a vehicle crash as the vehicle crash occurs or in the moments leading up to or immediately following the vehicle crash. Additionally, in some embodiments the sets of video images may also depict the vehicles involved in the vehicle crash as the vehicles approach the scene of the crash. For example, if a first vehicle turns right and crashes into a second vehicle after making the right turn, a set of video images may depict the first vehicle before the right turn as the vehicle approaches the scene of the vehicle crash.

In some embodiments, after a vehicle crash occurs the image receiving/reconstruction module 134 may transmit a request to providers or owners of the image capturing devices to obtain video images related to the scene of the vehicle crash. For example, the request may be transmitted via email, short message service (SMS), push notification, etc. As a result, the owners or providers may transmit sets of video images related to the scene of the vehicle crash to the liability assessment server 102. In other embodiments, sets of video images may be transmitted to the liability assessment server 102 without transmitting a request.

In any event, upon receiving the sets of video images related to the scene of the vehicle crash, the image receiving/reconstruction module 134 may assemble the sets of video images to create a compilation representing the sequence of events leading up to, during, and immediately after the vehicle crash as they actually occurred. For example, two vehicles may be involved in a head-on collision. The image receiving/reconstruction module 134 may obtain a first set of video images of a first vehicle travelling from east to west and a second set of video images of a second vehicle travelling from west to east resulting in the head-on collision. The liability assessment server 102 may generate a compilation which includes a zoomed out view of each of the sets of video images displayed side by side for the same points in time. The right portion of the compilation may include the first set of video images and the left portion of the compilation may include the second set of video images, so that the compilation depicts the two vehicles as they approach each other.

In another example, a rear-end collision may occur between a first vehicle approaching a traffic control signal and a second vehicle stopped at the traffic control signal. The image receiving/reconstruction module 134 may obtain a first set of video images of the first vehicle as it approaches the second vehicle which ends five seconds before the vehicle crash. A second set of video images may also be obtained which depicts the scene of the vehicle crash beginning seven seconds before the vehicle crash occurs and ending thirty seconds after the vehicle crash. Accordingly, the liability assessment server 102 may generate a compilation which includes the first set of video images followed by the second set of video images. In some embodiments, the overlap in the second set of video images from seven seconds before the vehicle crash until five seconds before the vehicle crash may be removed.

The crash analysis module 136 may obtain and analyze the compilation to generate crash data, to identify damage to vehicles or objects involved in the vehicle crash, and to identify injuries to vehicle occupants or pedestrians. The crash data may include speed, acceleration, orientation, and position of each of the vehicles during the vehicle crash. The crash data may also include an average or maximum speed or acceleration for a predetermined time interval (e.g., 30 seconds) leading up to the vehicle crash. Furthermore, the crash data may include distances between the vehicles, weather conditions, traffic conditions, and the states of traffic control signals (e.g., whether a traffic light is red, yellow, or green) to determine whether any of the vehicles ran a red light or accelerated through a yellow light. Additionally, the crash data may include indications of visibility for each of the drivers. For example, a driver backing out of a parking spot between two large vehicles may have limited peripheral visibility, whereas a driver backing out of an empty parking lot may be able to see vehicles several feet to her right or left. In another example, a driver travelling in a rain or snowstorm may have worse visibility than a driver travelling on a sunny day. Moreover, these are merely examples of crash data and are not intended to be limiting. The crash data may include any information which may be generated from the compilation to determine the amount each driver is at fault in the vehicle crash.

The crash analysis module 136 may also identify damage to each of the vehicles, such as damage to the bumper of the vehicle, to the hood, to one of the side panels, etc. Additionally, based on the compilation and the crash data, the crash analysis module 136 may estimate an amount of damage to each vehicle part and may estimate a cost for repairing the damage to the vehicle part. Furthermore, the crash analysis module 136 may identify injuries to vehicle occupants or pedestrians based on the compilation. For example, a set of video images may depict a passenger being thrown from the vehicle onto a nearby patch of grass adjacent to the road. The crash analysis module 136 may identify injuries to the passenger's legs based on the way the passenger lands, and may estimate that the passenger has a broken leg. In some embodiments, upon identifying an injury to a vehicle occupant or pedestrian, the crash analysis module 136 may transmit an alert to emergency personnel to provide emergency assistance such as an ambulance to the scene of the vehicle crash.

The fault determination module 138 may obtain the crash data, the amount of damage to each of the vehicles or objects involved in the vehicle crash, and the extent of the injuries to vehicle occupants or pedestrians. The fault determination module 138 may analyze the crash data to determine the amount each driver is at fault. The fault determination module 138 may also analyze the amount of damage to the vehicles or objects and injuries to estimate a total cost from the vehicle crash. Based on the analysis, the fault determination module 138 may transmit indications of percentages of fault for each driver to a client device 112-116 for display. The fault determination module 138 may also transmit an estimated total cost which each driver may be liable for as a result of the vehicle crash. In some embodiments, as mentioned above, the compilation may be used as a tool to aid in the assessment of liability. In such an embodiment, the fault determination module 138 may combine the crash data from the analysis of the compilation with additional information for assessing liability to determine the amount each driver is at fault.

The image capturing devices 120-126 may include, by way of example, a public surveillance camera 120, a satellite 122, several mobile device smart-phones 124a-b (also referred to herein as a "mobile device"), wearable computing devices, smart glasses, and/or smart watches which may capture video images of the scene of the crash from several angles, location, and/or points in time, a camera removably mounted on a monopod 126 which may be externally attached to one of the vehicles involved in the vehicle crash, to another vehicle, or held by a person viewing the vehicle crash as it occurs, or any other suitable device external to the vehicles involved in the vehicle crash for capturing video images of the scene of a vehicle crash.

The image capturing devices 120-126 may include image sensors for capturing sets of video images, a Global Positioning System (GPS) for determining the position and/or orientation of the image capturing device and/or of each video frame in the set of video images when the set of video images is captured, a gyroscope, and a clock for tracking the time when each set of video images and/or each video frame in the set of video images is captured.

Each of the image capturing devices 120-126 may capture sets of video images of the scene of the vehicle crash and/or of a vehicle, object, or pedestrian involved in the vehicle crash leading up to, during, or immediately after the vehicle crash. For example, if two vehicles are involved in the vehicle crash, a public surveillance camera may capture a first set of video images of the first vehicle from two minutes before the vehicle crash until the vehicle crash occurs. Additionally, an observer's smart-phone may capture a second set of video images of the second vehicle from one minute before the vehicle crash until one minute after the vehicle crash occurs. The image capturing devices 120-126 may then communicate the captured sets of video images to the liability assessment server 102 via the network 130. While some sets of video images may depict the same scene such as the scene of the vehicle crash as it occurs, the liability assessment server 102 may assemble the two sets of video images into a compilation to generate a representation of the actual events leading up to, during, and immediately after the vehicle crash. This is described in more detail below.

The client devices 112-116 may include, by way of example, a mobile device 112, a laptop computer 114, a desktop computer 116, a tablet computer, a cell phone, a personal digital assistant (PDA), a portable media player, a home phone, a wearable computing device, smart glasses, smart watches, phablets, other smart devices, devices configured for wired or wireless RF (Radio Frequency) communication, etc. Of course, any client device appropriately configured may interact with the liability assessment system 100. The client devices 112-116 need not necessarily communicate with the network 130 via a wired connection. In some instances, the client devices 112-116 may communicate with the network 130 via wireless signals and, in some instances, may communicate with the network 130 via an intervening wireless or wired device, which may be a wireless router, a wireless repeater, a base transceiver station of a mobile telephony provider, etc.

Each of the client devices 112-116 may interact with the liability assessment server 102 to receive web pages and/or server data and may display the web pages and/or server data via a client application and/or an Internet browser (described below). For example, the mobile device 112 may display an application screen of a client application and/or a web page to a user, may receive an input from the user, and/or may interact with the liability assessment server 102 depending on the type of user-specified input.

It will be appreciated that although only one liability assessment server 102 is depicted in FIG. 1, multiple servers 102 may be provided for the purpose of distributing server load, serving different web pages, etc. These multiple servers 102 may include a web server, an entity-specific server (e.g. an Apple® server, etc.), a server that is disposed in a retail or proprietary network, etc.

The liability assessment server 102 may communicate with the client devices 112-116 and the image capturing devices 120-126 via the network 130. The digital network 130 may be a proprietary network, a secure public Internet, a virtual private network and/or some other type of network, such as dedicated access lines, plain ordinary telephone lines, satellite links, combinations of these, etc. Where the digital network 130 comprises the Internet, data communication may take place over the digital network 130 via an Internet communication protocol.

Figure 2A:
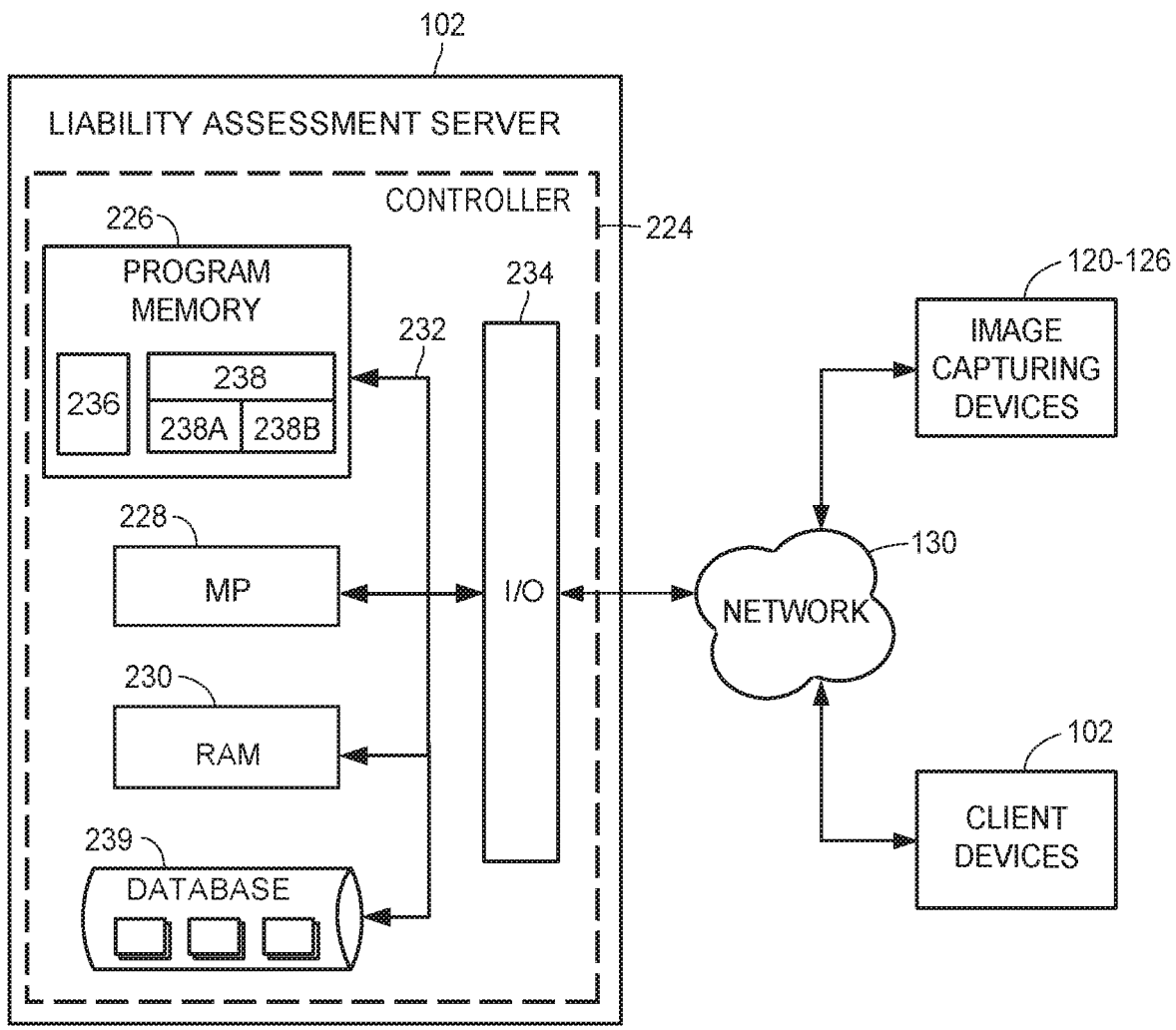
FIG. 2A illustrates a block diagram of an exemplary liability assessment server that can operate in the system of FIG. 1 in accordance with the presently described embodiments.

Turning now to FIG. 2A, the liability assessment server 102, may include a controller 224. The controller 224 may include a program memory 226, a microcontroller or a microprocessor (MP) 228, a random-access memory (RAM) 230, and/or an input/output (I/O) circuit 234, all of which may be interconnected via an address/data bus 232. The program memory 226 and the microprocessor 228 may be similar to the memory 140 and processor 132 respectively, as described in FIG. 1. In some embodiments, the controller 224 may also include, or otherwise be communicatively connected to, a database 239 or other data storage mechanism (e.g., one or more hard disk drives, optical storage drives, solid state storage devices, etc.). The database 239 may include data such as fault allocation data, web page templates and/or web pages, and other data necessary to interact with users through the network 130. It should be appreciated that although FIG. 2A depicts only one microprocessor 228, the controller 224 may include multiple microprocessors 228. Similarly, the memory of the controller 224 may include multiple RAMs 230 and/or multiple program memories 226. Although FIG. 2A depicts the I/O circuit 234 as a single block, the I/O circuit 234 may include a number of different types of I/O circuits. The controller 224 may implement the RAM(s) 230 and/or the program memories 226 as semiconductor memories, magnetically readable memories, and/or optically readable memories, for example.

As shown in FIG. 2A, the program memory 226 and/or the RAM 230 may store various applications for execution by the microprocessor 228. For example, a user-interface application 236 may provide a user interface to the liability assessment server 102, which user interface may, for example, allow the system administrator to configure, troubleshoot, and/or test various aspects of the liability assessment server's operation. A server application 238 may operate to generate and/or transmit amounts of fault for each driver involved in the vehicle crash and/or a total amount of damage incurred as a result of the vehicle crash to the client device(s) 112-116 for an insurance representative to review. The server application 238 may be a single module 238 or a plurality of modules 238A, 238B, and 238C (not shown) such as the image receiving/reconstruction module 134, the crash analysis module 136, and the fault determination module 138, respectively.

While the server application 238 is depicted in FIG. 2A as including two modules, 238A and 238B, the server application 238 may include any number of modules accomplishing tasks related to implementation of the liability assessment server 102.

Figure 2B:
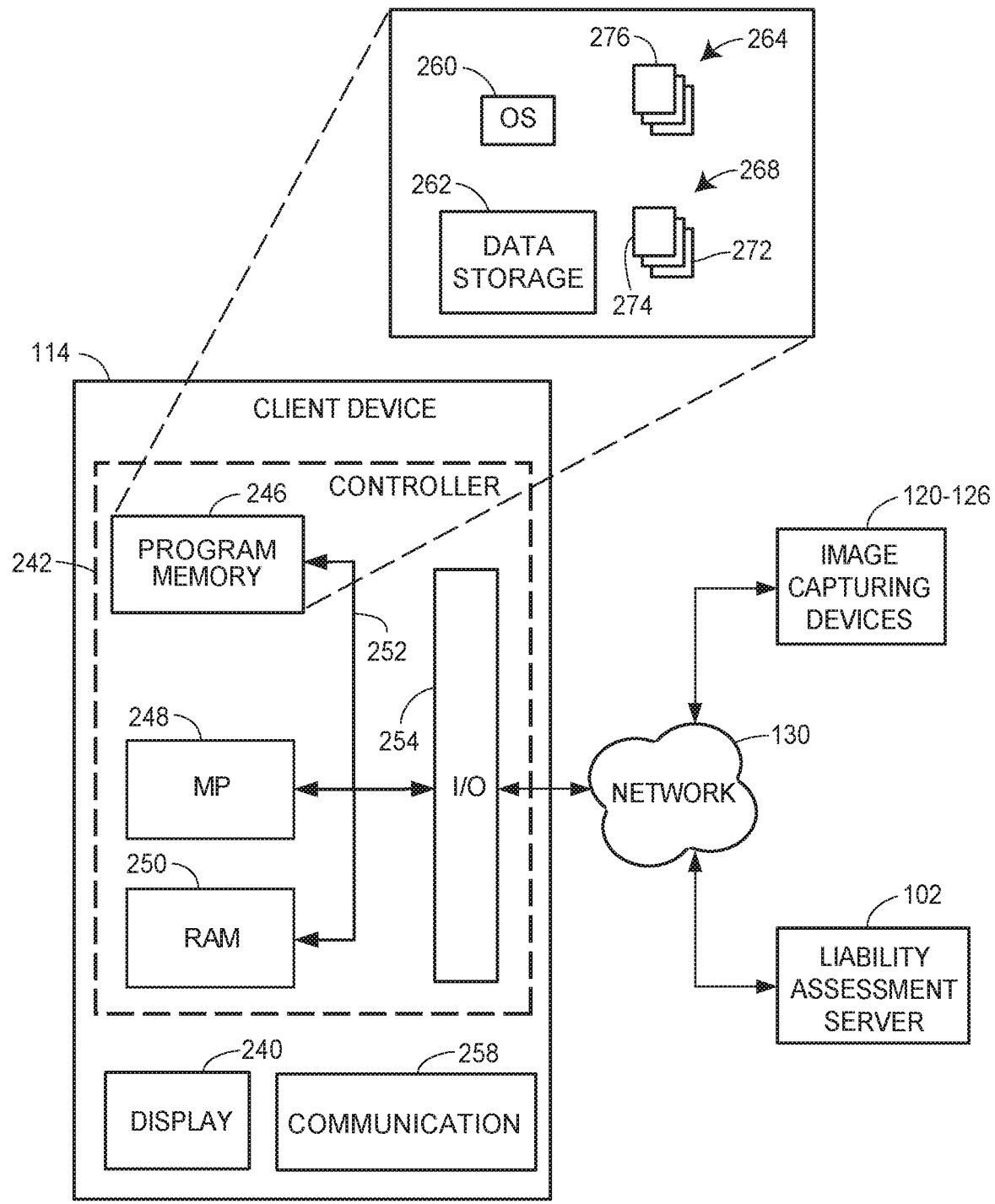
FIG. 2B illustrates a block diagram of an exemplary client device that can operate in the system of FIG. 1 in accordance with the presently described embodiments.

Referring now to FIG. 2B, the laptop computer 114 (or any of the client devices 112-116) may include a display 240, a communication unit 258, a user-input device (not shown), and, like the liability assessment server 102, a controller 242. Similar to the controller 224, the controller 242 may include a program memory 246, a microcontroller or a microprocessor (MP) 248, a random-access memory (RAM) 250, and/or an input/output (I/O) circuit 254, all of which may be interconnected via an address/data bus 252. The program memory 246 may include an operating system 260, a data storage 262, a plurality of software applications 264, and/or a plurality of software routines 268. The operating system 260, for example, may include Microsoft Windows®, OS X®, Linux®, Unix®, etc.

The data storage 262 may include data such as user profiles, application data for the plurality of applications 264, routine data for the plurality of routines 268, and/or other data necessary to interact with the liability assessment server 102 through the digital network 130. In some embodiments, the controller 242 may also include, or otherwise be communicatively connected to, other data storage mechanisms (e.g., one or more hard disk drives, optical storage drives, solid state storage devices, etc.) that reside within the laptop computer 114.

The communication unit 258 may communicate with the liability assessment server 102 via any suitable wireless communication protocol network, such as a wireless telephony network (e.g., GSM, CDMA, LTE, etc.), a Wi-Fi network (802.11 standards), a WiMAX network, a Bluetooth network, etc. The user-input device (not shown) may include a "soft" keyboard that is displayed on the display 240 of the laptop computer 114, an external hardware keyboard communicating via a wired or a wireless connection (e.g., a Bluetooth keyboard), an external mouse, or any other suitable user-input device. As discussed with reference to the controller 224, it should be appreciated that although FIG. 2B depicts only one microprocessor 248, the controller 242 may include multiple microprocessors 248. Similarly, the memory of the controller 242 may include multiple RAMs 250 and/or multiple program memories 246. Although the FIG. 2B depicts the I/O circuit 254 as a single block, the I/O circuit 254 may include a number of different types of I/O circuits. The controller 242 may implement the RAM(s) 250 and/or the program memories 246 as semiconductor memories, magnetically readable memories, and/or optically readable memories, for example.

The one or more processors 248 may be adapted and configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and/or transmitting information from the laptop computer 114.

One of the plurality of applications 264 may be a native application and/or web browser 270, such as Apple's Safari®, Google Chrome™, Microsoft Internet Explorer®, and Mozilla Firefox® that may be implemented as a series of machine-readable instructions for receiving, interpreting, and/or displaying web page information from the liability assessment server 102 while also receiving inputs from the user. Another application of the plurality of applications may include an embedded web browser 276 that may be implemented as a series of machine-readable instructions for receiving, interpreting, and/or displaying web page information from the liability assessment server 102. One of the plurality of routines may include a customer identification routine 272 which obtains identification information for a customer involved in a vehicle crash in response to a request by a user to receive liability information for the customer. Another routine in the plurality of routines may include a liability display routine 274 that obtains liability information for a customer involved in a vehicle crash and displays the liability information on the user interface 240.

Preferably, a user such as an insurance representative may launch the client application 266 from a client device, such as one of the client devices 112-116, to communicate with the liability assessment server 102 to implement the liability assessment system 100. Additionally, the user may also launch or instantiate any other suitable user interface application (e.g., the native application or web browser 270, or any other one of the plurality of software applications 264) to access the liability assessment server 102 to realize the liability assessment system 100.

Figure 3:
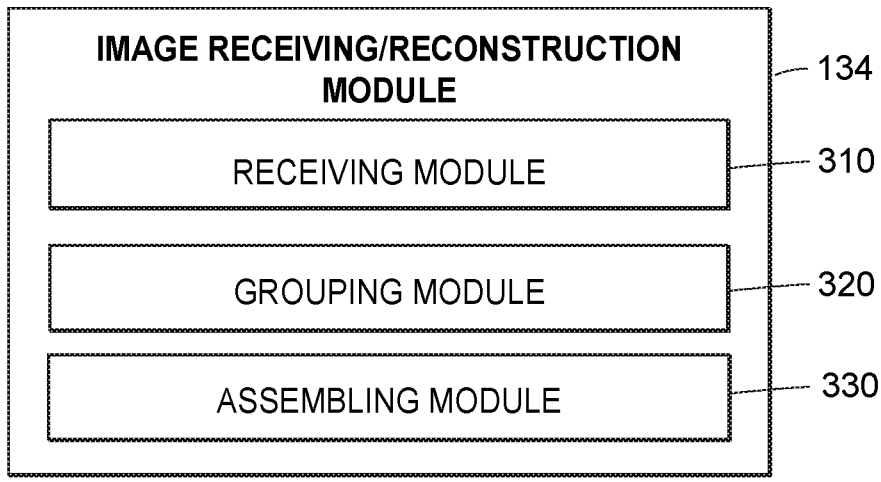
FIG. 3 illustrates an exemplary image receiving/reconstruction module in accordance with the presently described embodiments.

FIG. 3 is an exemplary block diagram of an image receiving/reconstruction module 134. The image receiving/reconstruction module 134 may include a receiving module 310, a grouping module 320, and an assembling module 330.

In some embodiments, the receiving module 310 may obtain an indication of a vehicle crash including the time and location of the vehicle crash. For example, one of the drivers involved in the vehicle crash may communicate with an insurance provider associated with the liability assessment server 102, and as a result the time and location of the vehicle crash may be transmitted to the liability assessment server 102. In some scenarios, drivers who report vehicle crashes shortly after the event occurs may receive payments on vehicle insurance claims faster than drivers who do not report or may receive discounts on vehicle insurance.

In another example, a driver may transmit indications of the time and location of the vehicle crash to the liability assessment server 102 via e-mail, SMS, client application screen, or any other suitable method of communication. In yet another example, autonomous vehicles, semi-autonomous vehicles, or any other vehicles capable of crash detection may transmit indications of the time and location to the liability assessment server 102 upon detecting a vehicle crash involving the vehicle.

In any event, when the receiving module 310 obtains an indication of a vehicle crash, the receiving module 310 may transmit a request to owners and/or users of image capturing devices 120-126 for sets of video images related to the vehicle crash. For example, the receiving module 310 may request sets of video images for an area within a predetermined threshold distance of the vehicle crash (e.g., a quarter mile radius, a half mile radius, a mile radius, a two mile radius, etc.), and within a predetermined threshold time of the vehicle crash (e.g., 10 seconds, 30 seconds, a minute, two minutes, etc.). The request may be transmitted to owners of public surveillance cameras 120, satellites 122, or any other publicly owned cameras.

Moreover, customers of the insurance provider associated with the liability assessment server 102 may opt-in to receive requests for sets of video images of public information and in turn may receive discounts on insurance products. As a result, the request may be transmitted to mobile devices 124a-b, wearable computing devices, smart glasses, and/or smart watches of the customers who opt-in. In this manner, the liability assessment system 100 may crowd source video related to the vehicle crash and may compile a scene of the sequence of events leading up to, during, and immediately after the vehicle crash based on the crowd sourced video image data.

In some embodiments, customers may transmit sets of video images without receiving a request. For example, a customer may transmit a set of video images related to a vehicle crash from a camera removably mounted on a monopod 126 or the driver of a vehicle involved in a rear-end collision may transmit a set of video images from a camera externally attached to the vehicle via a monopod, where the set of video images depicts vehicles behind the driver.

The image receiving/reconstruction module 134 may receive several sets of video images from an area within the predetermined threshold distance and time of the vehicle crash. The grouping module 320 may then classify each set of video images spatially, chronologically, and based on the orientation of the set of video images. As mentioned above, each set of video images may be time stamped with an indication of the start time and stop time of the set of video images, or may have an indication of the time for each video frame in the set of video images. Each set of video images may also include an indication of the location and orientation for the set, a starting and stopping location and orientation for the set, or a location and orientation for each video frame in the set. Furthermore, each set of video images may identify a zoom level and scale for the set of video images so that locations of objects within the video images such as vehicles may be identified. In some embodiments, the grouping module 320 may classify the sets of video images recursively beginning with a set of video images of the scene of the vehicle crash as it occurs.

For example, the grouping module 320 may identify the location and orientation of each vehicle involved in the vehicle crash when the vehicles collide from a first set of video images of the scene of the vehicle crash as it occurs. The grouping module 320 may also identify the location and orientation of each vehicle involved in the vehicle crash five seconds before the vehicles collide from the first set of video images. Based on the change in location and orientation of each vehicle in the five seconds leading up to the vehicle crash, the grouping module 320 may identify an estimated location and orientation of each vehicle ten seconds before the crash.

For example, if a first vehicle traveled east on a large highway 100 yards away from the scene of the vehicle crash five seconds before the vehicle crash occurs, the first vehicle is likely to have also traveled east on the same highway 200 yards away from the scene of the vehicle crash ten seconds before the vehicle crash occurs. The grouping module 320 may then classify a second set of video images which depicts the estimated location of the first vehicle ten seconds before the vehicle crash as corresponding to the first vehicle. Moreover, the grouping module 320 may classify a third set of video images which depicts the estimated location of the second vehicle involved in the vehicle crash ten seconds before the vehicle crash as corresponding to the second vehicle. The grouping module 320 may continue to recursively classify the sets of video images in a similar manner.

Furthermore, the grouping module 320 may classify sets of video images for the same location at different points in time as corresponding to that location. For example, a first set of video images may depict a four way traffic control signal from one second before the vehicle crash until one second after the vehicle crash. A second set of video images may depict the four way traffic control signal from seven seconds before the vehicle crash until one second before the vehicle crash. Both sets of video images may be classified as corresponding to the four way traffic control signal at the scene of the vehicle crash and the two sets of video images may be analyzed to determine changes in the four way traffic control signal as the colliding vehicles approach each other.

Additionally, the grouping module 320 may classify sets of video images based on the orientation. For example, sets of video images which depict the scene of the vehicle crash from an aerial view may be classified as corresponding to an aerial view of the scene of the vehicle crash. Other sets of video images which depict the first vehicle from a side view may be classified as corresponding to a side view of the first vehicle. Sets of video images may depict the first vehicle from a rear view may be classified as corresponding to a rear view of the first vehicle. While the grouping module 320 may classify sets of video images based on location, time, orientation, and estimated locations for vehicles and/or objects at different points in time, these are merely examples and the grouping module 320 may classify sets of video images based on any combination of location, time, orientation, and/or estimated locations for vehicles and/or objects at different points in time, or in any other suitable manner. In some embodiments, the grouping module 320 may also filter out sets of video images which do not depict any of the vehicles involved in the vehicle crash or the scene of the vehicle crash.

The assembling module 330 may obtain the classified sets of video images and assemble them into a compilation based on the classifications. Sets of video images classified as corresponding to the same vehicle may be assembled chronologically. For example, a first set of video images depicting the first vehicle for ten seconds starting from fifteen seconds before the vehicle crash may be followed by a second set of video images depicting the first vehicle for ten seconds starting from five seconds before the vehicle crash. When sets of video images include video frames which depict the same location at the same point in time, the assembling module 330 may filter out the overlapping portion of one of the sets. In the example above, if the second set of video images depicts the first vehicle for ten seconds starting from seven seconds before the vehicle crash, the assembling module 330 may filter out the first two seconds of the second set so that the first set depicts the first vehicle from fifteen seconds to five seconds before the vehicle crash, which is immediately followed by the second set which depicts the first vehicle from five seconds before the vehicle crash to three seconds after the vehicle crash.

In some embodiments, sets of video images corresponding to the same vehicle at different orientations may be assembled one after another. For example, each set of video images classified as corresponding to the first vehicle from an aerial view may be assembled chronologically to depict the first vehicle starting from 20 seconds before the vehicle crash until the vehicle crash occurs. Each set of video images classified as corresponding to the first vehicle from a side view may also be assembled chronologically to depict the first vehicle starting from 15 seconds before the vehicle crash until the vehicle crash occurs. The assembling module 330 may combine the sets of video images, such that the sets of video images from the aerial view are followed by the sets of video images from the side view in the compilation or vice versa.

Also in some embodiments, sets of video images may be assembled spatially to display multiple sets of video images simultaneously (e.g., side-by-side, top-to-bottom, etc.). For example, if a first vehicle travels south and a second vehicle travels north resulting in a head-on collision, the sets of video images corresponding to the first vehicle may be displayed at a top portion of a display screen while the sets of video images corresponding to the first vehicle may be displayed at a bottom portion of the display screen, so that the compilation depicts both vehicles as they approach each other. In some embodiments, the assembling module 330 may crop out portions of the sets of video images which do not depict the vehicles to fit portions from multiple sets of video images in a single display screen.

In other embodiments, the assembling module 330 may display each of the sets of video images at a lower zoom level to fit multiple sets in a single display screen. Additionally, in some scenarios a first classification may include sets of video images corresponding to a first vehicle, a second classification may include sets of video images corresponding to a second vehicle, and a third classification may include sets of video images which depict the scene of the vehicle crash including both vehicles. When the vehicles are far away from each other, the assembling module 330 may assemble sets of video images from the first and second classifications so that they are displayed simultaneously (e.g., side-by-side, top-to-bottom, etc.). However, as the vehicles approach each other within a predetermined threshold distance (e.g., 50 yards, 100 yards, 400 yards, etc.), sets of video images from the third classification may be displayed. More specifically, sets of video images from the first and second classifications may be displayed side-by-side for a 30 second interval beginning 40 seconds before the vehicle crash. The assembling module 330 may then display sets of video images from the third classification for a 20 second interval beginning 10 seconds before the vehicle crash.

While the assembling module 330 may assemble sets of video images based on location, time, and orientation, these are merely examples and the assembling module 330 may assemble sets of video images based on any combination of location, time, and/or orientation, or in any other suitable manner. Moreover, the sets of video images corresponding to a particular classification may be adjusted according to zoom level, so that each set of video images within the classification are displayed at the same zoom level.

Figure 6:
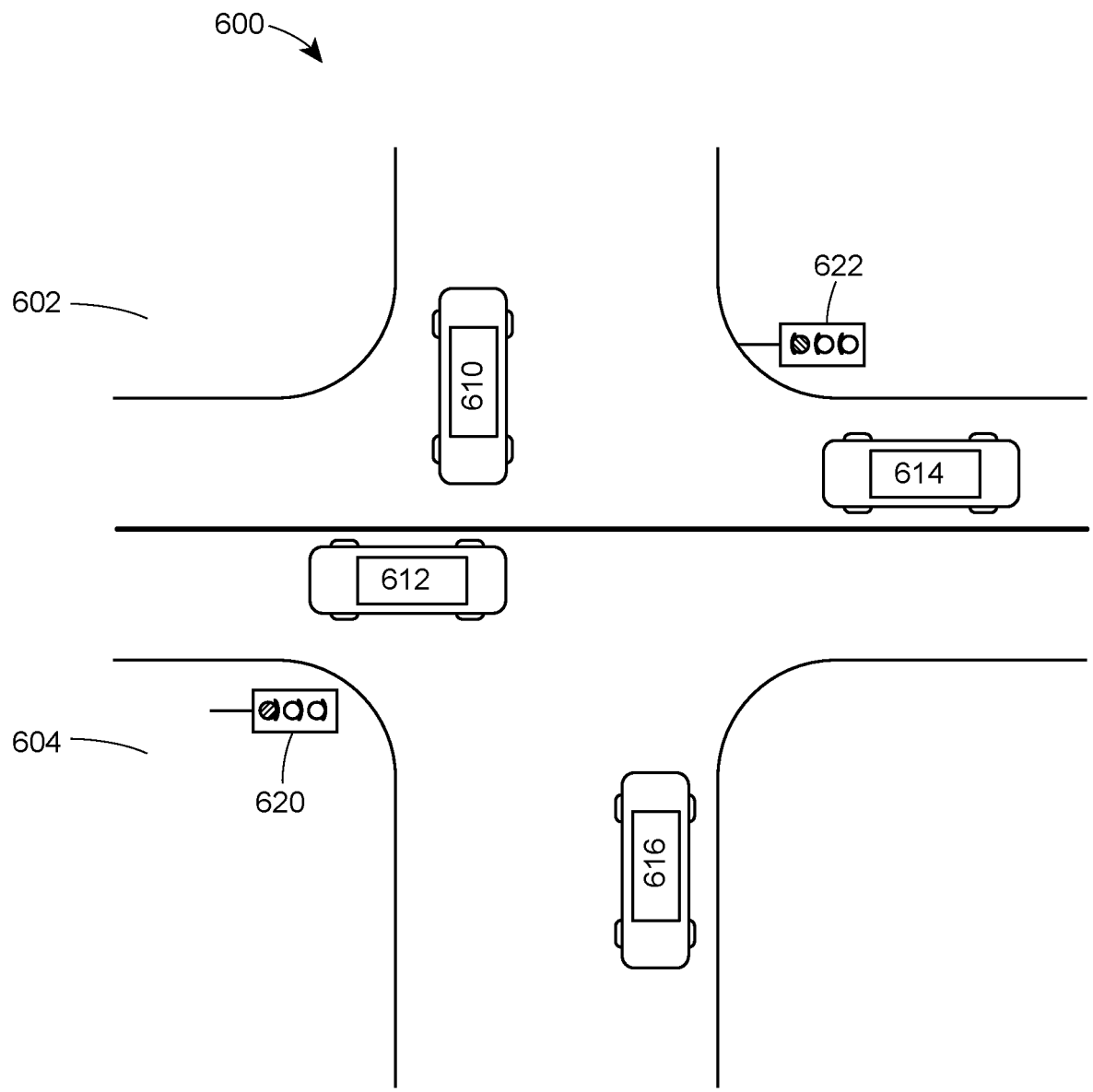
FIG. 6 illustrates an exemplary display screen including a video frame of the vehicle crash in accordance with the presently described embodiments.

FIG. 6 illustrates an exemplary display screen 600 including a video frame of a compilation representing the sequence of events leading up to, during, and immediately after a vehicle crash. The video frame may depict the scene two seconds before a vehicle crash between a first vehicle 610 and a second vehicle 612 occurred. Moreover, the display screen 600 may include a video frame from a first set of video images displayed at the top portion 602 of the display screen 600 and a video frame from a second set of video images displayed at the bottom portion 604 of the display screen 600. For example, the first set of video images may be captured from a public surveillance camera while the second set of video images may be captured from a satellite.

Each set of video images may be captured at the same orientation (from an aerial view), and the video frames may be captured at the same time (two seconds before the vehicle crash). However, the first set of video images may be captured at a location including a top half of a four way intersection, whereas the second set of video images may be captured at a location including a bottom half of the four way intersection. As a result, the assembling module 330 as shown in FIG. 3, may assemble the sets of video images spatially to display both of them simultaneously on the display screen. In some embodiments, the first and second sets of video images may have been captured at a lower zoom level, and the assembling module 330 may decrease the zoom level for each set of video images and/or crop out portions of the sets of video images which do not depict the vehicles to fit both sets of video images in the display screen.

In any event, the liability assessment server 102 may analyze the compilation to assess liability to each of the drivers in the vehicle crash. In some embodiments, the compilation may be used as a tool to aid in the assessment of liability to each of the drivers in the vehicle crash. For example, according to the display screen it appears the second vehicle 612 and a third vehicle 614 had green lights 620, 622. Based on typical traffic control signal patterns, the liability assessment system may be able to infer that the first vehicle 610 and a fourth vehicle 616 had red lights at this time. While the fourth vehicle 616 appears to have stopped before entering into the intersection, the first vehicle 610 appears to be about halfway into the intersection. Thus, the liability assessment server 102 may determine that the driver of the first vehicle 610 ran a red light and is solely at fault for the vehicle collision. However, in some scenarios additional video frames from the first and second sets of video images or from other sets of video images may cause the liability assessment server 102 to alter this determination.

Figure 4:
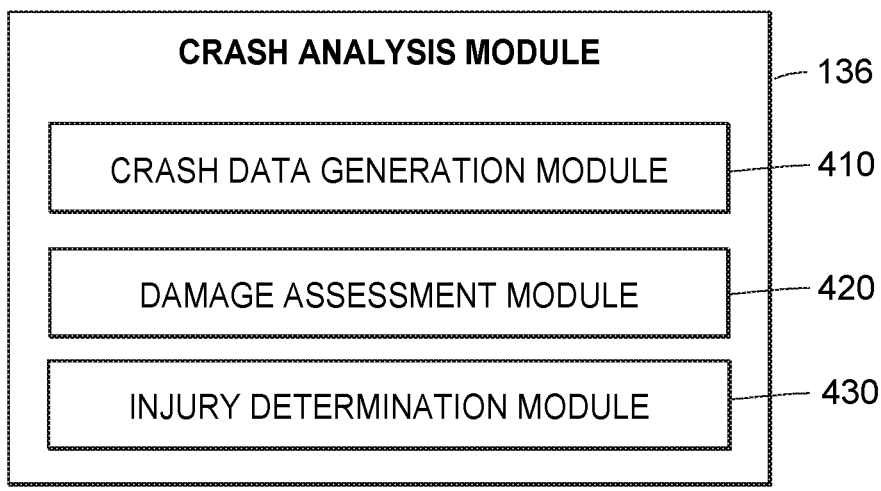
FIG. 4 illustrates an exemplary crash analysis module in accordance with the presently described embodiments.

In any event, once the sets of video images have been assembled into a compilation to depict the vehicle crash, the crash analysis module 136 may analyze the compilation. Turning now to FIG. 4, an exemplary block diagram of the crash analysis module 136 is shown. The crash analysis module 136 may include a crash data generation module 410, a damage assessment module 420, and an injury determination module 430. The crash data generation module 410 may analyze the compilation to determine crash data for the vehicle crash including impact characteristics for each of the vehicles involved in the vehicle crash. The crash data may include for example, weather conditions at the scene of the vehicle crash, traffic conditions at the scene of the vehicle crash, the status of traffic control signals at the scene of the vehicle crash (e.g., the traffic control signal facing the first vehicle changed from yellow to red one second before the first vehicle entered into the intersection and two seconds before the vehicle crash occurred), etc.

The crash data may also include impact characteristics such as the speed, acceleration, position and orientation of each vehicle at the time of the vehicle crash and speeds, accelerations, positions and orientations of each vehicle at predetermined threshold times before and/or after the vehicle crash (e.g., five seconds, ten seconds, thirty seconds, a minute, etc.). The impact characteristics may also include distances between the vehicles at the predetermined threshold times. For example, in a rear-end collision the vehicles may be 200 feet apart five seconds before the vehicle crash when they are both travelling over 70 miles per hour (mph). The distance may be compared to a minimum stopping distance for vehicles travelling at that speed to determine fault as described in more detail below. Additionally, the impact characteristics may include whether each vehicle is travelling forward or in reverse, and an amount of visibility for each vehicle. For example, a driver backing out of a parking spot between two large vehicles may have limited peripheral visibility, whereas a driver backing out of an empty parking lot may be able to see vehicles several feet to her right or left.

The crash data may be determined from the compilation depicting the vehicle crash. For example, positions of a vehicle at various points in time may be determined based on the GPS data for a video frame in the compilation which depicts the vehicle at a particular point in time. Moreover, speeds of the vehicle at various points in time may be determined based on the change in position of the vehicle over time, as determined by the GPS data for each video frame. Weather conditions may be determined using image processing techniques to identify rain, snow, wind, fog, clouds, etc. Traffic conditions may also be determined using image processing techniques to identify a number of vehicles on the road over a certain area. For example, a road that is densely crowded with vehicles may have heavy traffic whereas a road which has very few vehicles per square mile may have light traffic. Furthermore, the status of traffic control signals may also be identified using image processing techniques, by for example identifying the position and/or color of the light displayed by the traffic control signal. The amount of visibility for a driver may be identified based on the proximity of nearby vehicles or objects to the driver's vehicle as well as the weather conditions such as fog, clouds, rain, or snow.

Additionally, the damage assessment module 420 may identify damage to the vehicles involved in the vehicle crash and estimate an extent of the damage to the vehicles using the compilation. In some embodiments, the damage assessment module 420 may compare the position of vehicle parts relative to the center of the vehicle over time to identify damage to a vehicle. For example, the damage assessment module 420 may identify a center position of a vehicle 30 seconds before a vehicle crash using various image processing techniques. The damage assessment module 420 may also identify the positions of vehicle parts, such as the hood, front bumper, side door, etc. When the position of a vehicle part changes relative to the center position of the vehicle during or after the vehicle crash, the damage assessment module 420 may identify damage to the vehicle part. The damage assessment module 420 may also estimate the extent of the damage to the vehicle part based on the change in position of the vehicle part (e.g., a side door which moves one inch inward may be less damaged and may not require as many repairs as a side door which moves one foot inward).

In some embodiments, the damage assessment module 420 may compare the estimate of the extent of the damage to the vehicle based on the change in positions of vehicle parts to an estimate of the extent of the damage to the vehicle using the crash data to verify the accuracy of the estimate. In such an embodiment, the crash data may be compared to previous crash data for similar vehicles involved in previous vehicle crashes. When a similar vehicle having similar crash data as the vehicle is identified, the extent of the damage to the vehicle is estimated based on the extent of the damage to the similar vehicle involved in the previous vehicle crash. Then the extent of the damage identified using the crash data may be compared to the extent of the damaged based on the change in position of vehicle parts to verify the accuracy of the estimate.

In addition to estimating the extent of the vehicle damage using crash data and the change in position of vehicle parts, the damage assessment module 420 may also compare the portion of the compilation which depicts the vehicle after the vehicle crash to a template of damaged vehicles or damaged vehicle parts. When a match is identified, the damage assessment module 420 may estimate the extent of the damage to the vehicle or vehicle part based on the extent of the damage associated with the matching template. While the damage assessment module 420 may estimate the extent of the damage to a vehicle based on crash data, the change in position of vehicle parts, and by a comparison to a template of damaged vehicle or damaged vehicle parts, these are merely examples and the damage assessment module 420 may estimate the extent of the damage based on any combination of crash data, change in position of vehicle and comparisons to templates, or in any other suitable manner.

Furthermore, the injury determination module 430 may identify or predict injuries to vehicle occupants or pedestrians involved in the vehicle crash and estimate an extent of the injuries to the vehicle occupants or pedestrians using the compilation. To identify injuries, the injury determination module 430 may identify whether any of the vehicles struck a pedestrian based on the video images depicting the scene during the vehicle crash and for a predetermined amount of time after the vehicle crash (e.g., 10 seconds). Also, the injury determination module 430 may identify the number of vehicle occupants in each vehicle and the position of the vehicle occupants within the vehicle. For example, the position of passengers thrown from the vehicle may be identified based on the compilation. Moreover, the position of passengers within the vehicle may be identified from the sets of video images captured from a side view.

Using the crash data, the injury determination module 430 may identify or predict types of injuries and estimate the extent of injuries to vehicle occupants or pedestrians based on historical injury data for similar vehicles having similar crash data, number of vehicle occupants, and positions of vehicle occupants as the vehicle. Also, video images of vehicle occupants ejected from the vehicle or pedestrians may be compared to templates of injured vehicle occupants or pedestrians. When a match is identified, the injury determination module 430 may identify injuries and the extent of the injuries to the vehicle occupants or pedestrians based on the extent of the injuries associated with the matching template.

Moreover, the injury determination module 430 may determine a change in position and orientation of a pedestrian or vehicle occupant ejected from a vehicle over time, or change in position and orientation of body parts of the pedestrian or vehicle occupant ejected from the vehicle. The change in position and orientation of a pedestrian or vehicle occupant over time may be compared to historical injury data for previous pedestrians or vehicle occupants involved in vehicle crashes. When a match is identified, the injury determination module 430 may identify injuries and the extent of the injuries to the vehicle occupants or pedestrians based on the extent of the injuries associated with the matching previous pedestrians or vehicle occupants.

For example, a pedestrian who falls backwards and strikes his head at a speed above a predetermined threshold may be likely to have suffered serious head trauma and may be unconscious. In another example, the injury determination module 430 may determine that a vehicle occupant's leg twisted at an angular velocity above a predetermined threshold; which may indicate that the vehicle occupant is likely to have suffered a serious knee injury such as a torn anterior crucial ligament (ACL). While the injury determination module 430 may estimate the extent of the injuries to a pedestrian or vehicle occupant based on crash data, the change in position and orientation of the vehicle occupant, and by a comparison to a template of an injured pedestrian or vehicle occupant, these are merely examples and the injury determination module 430 may estimate the extent of injuries based on any combination of crash data, change in position of vehicle occupants or pedestrians and comparisons to templates, or in any other suitable manner.

In some embodiments, the extent of injuries may be categorized based on severity level. For example, injuries rendering the person unconscious, resulting in a bone break or facture, resulting in major blood loss, internal bleeding, spinal injuries, or heart failure may be categorized as "very severe." Injuries resulting in a sprain or muscle tear may be categorized as "severe," and injuries resulting in minor bleeding, cuts, or whiplash may be categorized as "minor." In other embodiments, each type of injury may be assigned a score based on the severity of the injury where injuries of higher severity receive higher scores. Also in some embodiments, the sets of video images may be received and analyzed in real-time or at least near real-time as the vehicle crash occurs. When an injury is identified which exceeds a predetermined threshold severity (e.g., in the "severe" category or above), the injury determination module 430 may transmit an alert to emergency personnel such as a police department, a fire department, paramedics, etc. In some embodiments, the alert may include a request for an ambulance at the scene of the vehicle crash. The alert may also include an indication that the vehicle occupant or pedestrian has been in a vehicle crash and the estimated extent of the injury.

Figure 5:
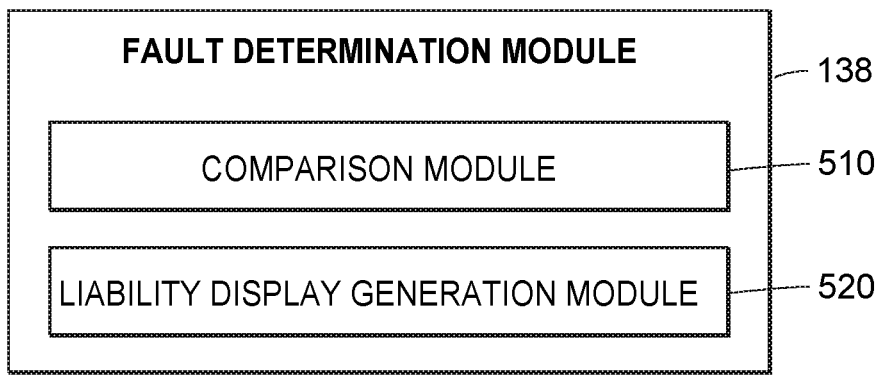
FIG. 5 illustrates an exemplary fault determination module in accordance with the presently described embodiments.

FIG. 5 is an exemplary block diagram of the fault determination module 138. The fault determination module 138 may include a comparison module 510 and a liability display generation module 520. The comparison module 510 may allocate a percentage of fault to each of the drivers involved in the vehicle crash. In some embodiments, the percentage of fault may be allocated by analyzing the crash data to determine fault characteristics, which may be compared to a fault allocation profile. In some embodiments, as mentioned above, the compilation may be used as a tool to aid in the assessment of liability. In such an embodiment, the fault determination module 138 may combine the crash data from the analysis of the compilation with additional information for assessing liability to allocate the percentage of fault to each driver.

Fault characteristics may include a type of collision (e.g., in a rear end collision the driver from behind more be more likely to be at fault than the driver in front), whether a driver disobeyed a traffic control signal or stop sign or did not follow other traffic laws such as speeding, passing a vehicle in a no passing zone, etc., the visibility of the driver, whether the driver is in reverse, whether the driver exceeded the minimum stopping distance between the driver's vehicle and the vehicle in front of the driver according to the driver's vehicle speed, whether the driver was weaving in and out of several lanes before the vehicle crash, or any other suitable characteristics that may be indicative of the driver's fault in the vehicle crash.

More specifically, the comparison module 510 may determine whether a driver disobeyed a traffic control signal by comparing the state of the traffic control signals at the scene of the vehicle crash and the position of the driver's vehicle at a point in time. For example, if the driver's vehicle enters the intersection after the traffic control signal changes from yellow to red, the comparison module 510 may determine that the driver ignored the traffic control signal. The comparison module 510 may also determine that the driver disobeyed a stop sign if the speed of the driver's vehicle was not less than a predetermined threshold speed (e.g., 1 mph, 2 mph, 5 mph, etc.) at a position corresponding to the stop sign.

Moreover, the comparison module 510 may determine whether the driver exceeded the minimum stopping distance between the driver's vehicle and the vehicle in front of the driver by obtaining the speed of the driver's vehicle and the distance between the driver's vehicle and the vehicle in front of the driver at a point in time. The distance may then be compared to a minimum stopping distance according to the driver's speed (e.g., 40 feet for 20 mph, 75 feet for 30 mph, 100 feet for 40 mph, etc.). If the distance is less than the minimum stopping distance, the comparison module 510 may determine that the driver did not exceed the minimum stopping distance increasing the likelihood that the driver is at fault for the vehicle crash and/or the driver's percentage of fault. In some embodiments, the minimum stopping distance may be a combination or aggregation of the distance a vehicle at a particular speed will travel from the point the vehicle's brakes are applied to the point when the vehicle comes to a complete stop and the distance a vehicle at the particular speed will travel for the length of time it takes an average driver to react and apply the brakes.

The fault characteristics for each driver involved in the vehicle crash may then be compared to a fault allocation profile to allocate a percentage of fault to each of the drivers. In some scenarios, one of the drivers may be completely at fault (100 percent) while the other drivers are not at fault at all (0 percent). In other scenarios, each of the drivers may be at least partially at fault for the vehicle crash. In yet other scenarios, none of the drivers may be at fault. The fault allocation profile may include several sets of fault characteristics from previous vehicle crashes and corresponding percentages of fault associated with each set of fault characteristics.

For example, the fault allocation profile may indicate that drivers who exceeded the speed limit, ran a red light, and were involved in a rear end collision with the vehicle in front of them received 99 percent of the fault whereas drivers of the vehicles in front received 1 percent of the fault. In another example, the fault allocation profile may indicate that drivers having poor visibility due to poor weather conditions such as heavy rain, snow, or fog, who exceeded a predetermined threshold speed above the speed limit, and were involved in a broadside collision with a vehicle who did not come to a complete stop at a stop sign received 70 percent of the fault whereas drivers of the vehicles who did not come to a complete stop at the stop sign received 30 percent of the fault. When the fault characteristics match a set of fault characteristics from the fault allocation profile, the comparison module 510 may allocate a percentage of fault to each of the drivers based on the corresponding percentages of fault for the matching set.

In addition to allocating percentages of fault, the fault determination module 138 may also estimate the total amount of damage caused by the vehicle crash. In this manner, the percentages of fault for each driver may be combined with the total amount of damage to determine the amount of liability for each driver. For example, a driver who is 60 percent at fault in a vehicle crash that caused $10,000 worth of damage may be liable for $6,000. However, this is merely an example of how the liability may be calculated and liability may be calculated in any other suitable manner.

In any event, the liability display generation module 520 may estimate the total amount of damage caused by the vehicle crash by obtaining the extent of the damage to each of the vehicles involved in the vehicle crash and the extent of the injuries to each of the vehicle occupants or pedestrians injured in the vehicle crash. For each vehicle, the liability display generation module 520 may compare the extent of the damage to repair history data from previous vehicle crashes for similar vehicles having similar damage. The repair history data may indicate a corresponding cost to repair the vehicle. For each of the vehicles in the vehicle crash, when the extent of the damage matches with a similar vehicle having similar damage in the repair history data the liability display generation module 520 assigns the corresponding cost from the repair history data to the vehicle. The corresponding costs may be aggregated or combined in any suitable manner to determine a total cost associated with repairing the damaged vehicles in the vehicle crash.

Additionally, the liability display generation module 520 may compare the extent of the injuries to vehicle occupants or pedestrians involved in the vehicle crash to the historical injury data, as mentioned above, from previous vehicle crashes for people having similar injuries. The historical injury data may indicate a corresponding cost associated with the medical bills, lost wages, etc., associated with the injury. For each of the injuries to vehicle occupants or pedestrians involved in the vehicle crash, when the extent of the injury matches with a similar injury in the repair history data, the liability display generation module 520 assigns the corresponding cost associated with the injury data to the vehicle occupant or pedestrian. The corresponding costs for each of the vehicle occupants or pedestrians may be aggregated or combined in any suitable manner to determine a total cost associated with the injuries. In some embodiments, the total cost associated with repairing the damaged vehicles may be aggregated or combined in any suitable manner with the total cost associated with the injuries to estimate the total amount of damage caused by the vehicle crash.

Moreover, the liability display generation module 520 may generate a liability display screen. The liability display screen may include indications of each of the drivers involved in the vehicle crash, such as the names of the drivers, an insurance policy name or number associated with the drivers who have vehicle insurance policies with the insurance provider, etc. The liability display screen may also include indications of the percentages of fault determined for each of the drivers. In some embodiments, the indications may be the percentages of fault. In other embodiments, the indications may be categories such as "No Fault," "Low Fault," "High Fault," etc., where each category corresponds to a range of percentages of fault. For example, less than five percent fault may correspond to "No Fault," between 5 and 35 percent fault may correspond to "Low Fault," above 50 percent fault may correspond to "High Fault," etc.

In addition to indications of the percentages of fault, the liability display screen may include an indication of the total amount of damage caused by the vehicle crash and/or indications of the total cost associated with repairing the vehicles involved in the vehicle crash and the total cost associated with the injuries caused by the vehicle crash. The liability display generation module 520 may transmit the liability display screen to a client computing device, such as the client computing device of an insurance representative. In this manner, the insurance representative may view the amount of liability for each of the drivers in the vehicle crash, and may process insurance claims related to the vehicle crash.

Furthermore, the liability display generation module 520 may transmit the compilation, the crash data, indications of the percentages of fault allocated to each driver involved in the vehicle crash, and/or indications of the total amount of damage caused by the vehicle crash to one or several autonomous or semi-autonomous vehicles. The autonomous or semi-autonomous vehicles may analyze this information using machine learning techniques, for example. Additionally, in some embodiments the autonomous or semi-autonomous vehicle may compare the compilation and the crash data to previous compilations and crash data for previous vehicle crashes at similar locations.

Based on the analysis, the autonomous or semi-autonomous vehicles may adjust driving behavior such as speeds, routes, etc., to avoid vehicle crashes in locations having a large number of vehicle crashes. In some scenarios, the autonomous or semi-autonomous vehicle may identify that there is low visibility on Main Street at dusk. As a result, the autonomous or semi-autonomous vehicles may turn on their lights just before turning onto Main Street. In another scenario, the autonomous or semi-autonomous vehicle may identify slippery road conditions within an hour of rainfall in Anytown, USA. Accordingly, the autonomous or semi-autonomous vehicles may reduce speed when travelling on the roads of Anytown within an hour of rainfall.

In an exemplary scenario, John Doe may be pulling out of his driveway on a sunny day and making a left turn when the left side of his vehicle is struck by an oncoming vehicle heading in the opposite direction. Based on the scene after the vehicle crash it may be unclear whether John Doe is at fault for making the turn without sufficient distance between his vehicle and the oncoming vehicle, whether the driver of the oncoming vehicle is at fault, or whether both drivers are at fault. However, the liability assessment system 100 may generate a compilation of the sequence of events leading up to, during, and immediately after the vehicle crash. The compilation may indicate that when John Doe began to make the left turn the oncoming vehicle was several hundred yards away from John Doe's vehicle and was about to approach a stop sign. As John Doe's vehicle entered onto the street, the oncoming vehicle did not stop at the stop sign, accelerated to a speed substantially above the speed limit (e.g., more than 20 mph above the speed limit) and crashed into the side of John Doe's vehicle before he was able to finish making the left turn. Thus, based on the compilation the liability assessment system 100 may determine that the driver of the oncoming vehicle is 100 percent at fault and may be liable for the total amount of damage caused by the vehicle crash.

Figure 7:
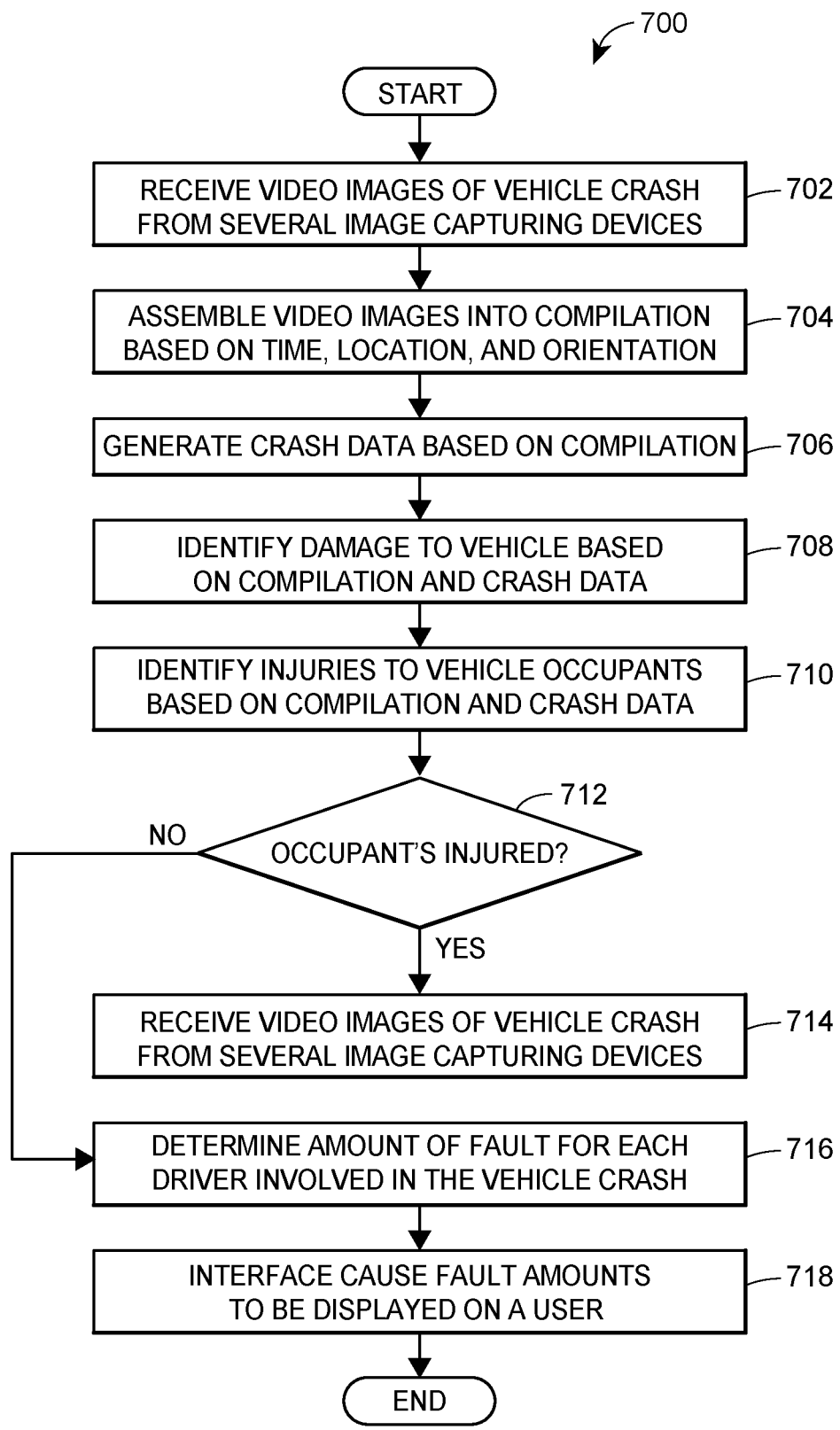
FIG. 7 illustrates a flow diagram representing an exemplary method for analyzing liability in a vehicle crash in accordance with the presently described embodiments.

FIG. 7 depicts a flow diagram representing an exemplary method 700 for analyzing liability in a vehicle crash. The method may be executed on the liability assessment server 102. In some embodiments, the method 700 may be implemented in a set of instructions stored on a non-transitory computer-readable memory and executable on one or more processors of the liability assessment server 102. For example, the method 700 may be performed by the image receiving/reconstruction module 134, the crash analysis module 136, and/or the fault determination module 138 of FIG. 1.

At block 702, the image receiving/reconstruction module 134 may receive several sets of video images related to a vehicle crash from several image capturing devices. In some embodiments, the image capturing devices may be external to the vehicles involved in the vehicle crashes. The image capturing devices may include, for example, public surveillance cameras, mobile devices, satellites, wearable computing devices, smart glasses, smart watches, cameras removably mounted on a monopod, or any other suitable image capturing device. The sets of video images may be captured for an area within a predetermined threshold distance and time of the vehicle crash. Also in some embodiments, the sets of video images may be transmitted to the image receiving/reconstruction module 134 in response to a request for sets of video images related to the vehicle crash. For example, the image receiving/reconstruction module 134 may obtain an indication of a vehicle crash at a particular location and time and may transmit a request to owners and/or users of image capturing devices for sets of video images related to the vehicle crash.

In any event, the image receiving/reconstruction module 134 may assemble the several sets of video images into a compilation which displays a representation of the sequence of events leading up to, during, and immediately after the vehicle crash as they actually occurred (block 704). In some embodiments, each set of video images may be grouped based on the location, orientation, and/or time corresponding to the set of video images. Sets of video images grouped within the same classification (e.g., sets of video images corresponding to a first vehicle captured from a rear view) may be assembled chronologically. Furthermore, in some embodiments, sets of video images from multiple classifications may be displayed within a single display screen, simultaneously (e.g., side-by-side, top-to-bottom, etc.).

Once the compilation is generated, the crash analysis module 136 may analyze the compilation to generate crash data including impact characteristics for each of the vehicles involved in the vehicle crash (block 706). The crash data may include for example, weather conditions at the scene of the vehicle crash, traffic conditions at the scene of the vehicle crash, the status of traffic control signals at the scene of the vehicle crash, etc. Impact characteristics for a vehicle involved in the vehicle crash may include the speed, acceleration, position, and orientation of the vehicle at the time of the vehicle crash and speeds, accelerations, positions, and orientations of the vehicle at predetermined threshold times before and/or after the vehicle crash (e.g., five seconds, ten seconds, thirty seconds, a minute, etc.), distances between the vehicle and a vehicle in front of the vehicle at the predetermined threshold times, whether the vehicle is travelling forward or in reverse, the amount of visibility for the driver of the vehicle, etc.

In addition to generating crash data, the crash analysis module 136 may identify damage to each of the vehicles involved in the vehicle crash based on the compilation and the crash data (block 708). The crash analysis module 136 may also identify injuries to vehicle occupants and pedestrians involved in the vehicle crash based on the compilation and the crash data (block 710). In some embodiments, the extent of injuries may be categorized or scored based on severity level. For example, injuries rendering the person unconscious, resulting in a bone break or facture, resulting in major blood loss, internal bleeding, spinal injuries, or health failure may be assigned the highest score or severity category. Also in some embodiments, the sets of video images may be received and analyzed in real-time or at least near real-time as the vehicle crash occurs. When a vehicle occupant or pedestrians suffers from an injury which exceeds a predetermined threshold severity (e.g., in the "severe" category or above or having a severity score higher than 70 out of 100), the crash analysis module 136 may transmit an alert to emergency personnel such as a police department, a fire department, paramedics, etc. (block 714).

Additionally, the fault determination module 138 may allocate a percentage of fault to each of the drivers involved in the vehicle crash (block 716). In some embodiments, as mentioned above, the compilation may be used as a tool to aid in the assessment of liability. In such an embodiment, the fault determination module 138 may combine the crash data from the analysis of the compilation with additional information for assessing liability to determine the amount each driver is at fault.

In some embodiments, the fault determination module 138 may allocate a percentage of fault by determining fault characteristics for each of the drivers based on the crash data. Fault characteristics may include a type of collision, whether a driver disobeyed a traffic control signal or stop sign or did not follow other traffic laws such as speeding, passing a vehicle in a no passing zone, etc., the visibility of the driver, whether the driver is in reverse, whether the driver exceeded the minimum stopping distance between the driver's vehicle and the vehicle in front of the driver according to the driver's speed, the driver's speed, whether the driver was weaving in and out of several lanes before the vehicle crash, or any other suitable characteristics which may be indicative of the driver's fault in the vehicle crash.

The fault characteristics may be compared to a fault allocation profile to allocate a percentage of fault to each of the drivers. The fault allocation profile may include several sets of fault characteristics from previous vehicle crashes and corresponding percentages of fault associated with each set of fault characteristics. For example, the fault allocation profile may indicate that when the front of a first vehicle crashes into the side of a second vehicle at a location having good visibility without any stop signs or traffic control signals and the second vehicle did not exceed the speed limit or engage in any form of careless or reckless driving, the first vehicle is 100 percent at fault while the second vehicle is 0 percent at fault.

In addition to allocating percentages of fault, the fault determination module 138 may also estimate the total amount of damage caused by the vehicle crash. The total amount of damage may be estimated by combining or aggregating a first cost associated with the damage to the vehicles and a second cost associated with injuries to the vehicle occupants or pedestrians. The first and second costs may be determined by comparing the damage and injuries to data from previous vehicle crashes involving similar vehicles, amounts of damage, and injuries. The costs associated with the matching previous vehicle crashes may be used as the first and second costs.

Then the fault determination module 138 may cause indications of the percentages of fault and the total amount of damage caused by the vehicle crash to be displayed on a user interface of a client device (block 718), such as an insurance representative's client device. In some embodiments, the indications may be displayed on a liability display screen which may include the names of the drivers, percentages of fault for each of the drivers, and the total amount of damage caused by the vehicle crash. Furthermore, the compilation, the crash data, indications of the percentages of fault allocated to each driver involved in the vehicle crash, and/or indications of the total amount of damage caused by the vehicle crash to one or several autonomous or semi-autonomous vehicles for further collision avoidance.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

We claim:

1. A computer-implemented method for analyzing liability in a vehicle crash using video image data, the method executed by one or more processors programmed to perform the method, the method comprising:

receiving, at one or more processors, an indication of a location and time of a vehicle crash;

capturing, by a plurality of image capturing devices external to one or more vehicles involved in the vehicle crash, a plurality of sets of video images for an area within a predetermined threshold distance of the location of the vehicle crash and within a predetermined threshold time from the time of the vehicle crash, the plurality of sets of video images including overlapping views from different locations;

receiving, at the one or more processors, the plurality of sets of video images;

combining, by the one or more processors, the plurality of sets of video images which depict the vehicle spatially and chronologically;

generating, by the one or more processors, a compilation that represents a scene of the vehicle crash, wherein the compilation depicts a sequence of events leading up to, during, and after the vehicle crash as the sequence of events actually occurred;

analyzing, by the one or more processors, the compilation to determine one or more fault characteristics of the vehicle crash including:

analyzing the compilation to determine crash data for a first vehicle of the one or more vehicles involved in the vehicle crash, the crash data including at least one of: a speed of the first vehicle at the time of the vehicle crash, a distance between the first vehicle and a second vehicle in front of the first vehicle within the predetermined threshold time from the time of the vehicle crash, an acceleration of the first vehicle at the time of the vehicle crash, an orientation of the first vehicle at the time of the vehicle crash, a position of the first vehicle relative to one or more objects which collide with the first vehicle at the time of the vehicle crash, weather conditions at the time and location of the vehicle crash, traffic conditions at the time and location of the vehicle crash, or a state of one or more traffic control signals at the time and location of the vehicle crash;

analyzing the compilation to identify damage to the one or more vehicles involved in the vehicle crash; and
determining an extent in which a driver of the first vehicle caused the damage based on the compilation and the crash data;
assessing, by the one or more processors, liability for one or more drivers of the one or more vehicles involved in the vehicle crash based on the fault characteristics; and
causing, by the one or more processors, indications of the assessed liabilities for the one or more drivers to be displayed on a user interface.

2. The method of claim 1, wherein causing indications of the assessed liabilities for the one or more drivers to be displayed on a user interface includes:
causing, by the one or more processors, indications of percentages of fault allocated to each of the drivers to be displayed on the user interface based on the assessed liability for each of the drivers; and
causing, by the one or more processors, an indication of a total amount of damage caused by the vehicle crash to be displayed on the user interface based on the analysis of the compilation.

3. The method of claim 2, wherein analyzing the compilation to determine one or more fault characteristics of the vehicle crash includes:
analyzing, by the one or more processors, the compilation to identify one or more injuries to vehicle occupants or pedestrians involved in the vehicle crash and to determine an extent of each of the injuries.

4. The method of claim 3, wherein the plurality of sets of video images are received in at least near real-time as the vehicle crash occurs; and
when the extent of at least one of the injuries exceeds a predetermined threshold severity, transmitting, by the one or more processors, an alert to emergency personnel including a request to receive an ambulance at the location of the vehicle crash.

5. The method of claim 4, wherein the alert further includes an indication of a type of the injuries based on the analysis of the compilation.

6. The method of claim 2, wherein analyzing the compilation to determine one or more fault characteristics of the vehicle crash further includes, for a first vehicle:
analyzing, by the one or more processors, the compilation to determine a distance between the first vehicle and a second vehicle in front of the first vehicle at a point in time;
analyzing, by the one or more processors, the compilation to determine a speed of the first vehicle at the point in time when the first vehicle is at the distance from the second vehicle;
comparing, by the one or more processors, the distance to a minimum stopping distance for the speed of the first vehicle; and
when the distance is less than the minimum stopping distance, determining, by the one or more processors, that a driver of the first vehicle is at fault for a rear end collision with the second vehicle.

7. The method of claim 1, wherein receiving a plurality of sets of video images from one or more image capturing devices includes:
receiving, at the one or more processors, a plurality of sets of video images from a plurality of the image capturing devices for the area within the predetermined threshold distance of the location of the vehicle crash and within the predetermined threshold time from the time of the vehicle crash, wherein each of the plurality of sets of video images depicts at least one of the one or more vehicles involved in the vehicle crash.

8. The method of claim 1, further comprising:
transmitting, by the one or more processors, the compilation and crash data to one or more autonomous or semi-autonomous vehicles for collision avoidance at the location of the vehicle crash;
wherein the autonomous or semi-autonomous vehicles compare the compilation and the crash data to previous compilations and crash data for locations within the predetermined threshold distance of the location of the vehicle crash and adjust driving behavior for the autonomous or semi-autonomous vehicles when travelling at the locations based on the comparison.

9. The method of claim 1, wherein the one or more image capturing devices includes at least one of: (i) a public surveillance camera; (ii) a satellite; (iii) a plurality of mobile devices; or (iv) a camera removably mounted on a monopod which is externally attached to one of the one or more vehicles.

10. A system for analyzing liability in a vehicle crash using video image data, the system comprising:
a plurality of image capturing devices external to one or more vehicles involved in a vehicle crash and configured to capture a plurality of sets of video images for an area within a predetermined threshold distance of a location of the vehicle crash and within a predetermined threshold time from a time of the vehicle crash, the plurality of sets of video images including overlapping views from different locations;
one or more processors;
a communication network;
a non-transitory computer-readable memory coupled to the one or more processors, and the communication network, and storing thereon instructions that, when executed by the one or more processors, cause the system to:
receive, via the communication network, an indication of the location and time of the vehicle crash;
receive, via the communication network, the plurality of sets of video images from the plurality of image capturing devices;
combine the plurality of sets of video images which depict the vehicle spatially and chronologically;
generate a compilation that represents a scene of the vehicle crash, wherein the compilation depicts a sequence of events leading up to, during, and after the vehicle crash as the sequence of events actually occurred;
analyze the compilation to determine one or more fault characteristics of the vehicle crash including:
analyzing the compilation to determine crash data for a first vehicle of the one or more vehicles involved in the vehicle crash, the crash data including at least one of: a speed of the first vehicle at the time of the vehicle crash, a distance between the first vehicle and a second vehicle in front of the first vehicle within the predetermined threshold time from the time of the vehicle crash, an acceleration of the first vehicle at the time of the vehicle crash, an orientation of the first vehicle at the time of the vehicle crash, a position of the first vehicle relative to one or more objects which collide with the first vehicle at the time of the vehicle crash, weather conditions at the time and location of the vehicle crash, traffic conditions at the time and location of the vehicle crash, or a state of one or more traffic control signals at the time and location of the vehicle crash;

analyzing the compilation to identify damage to the one or more vehicles involved in the vehicle crash; and determining an extent in which a driver of the first vehicle caused the damage based on the compilation and the crash data;

assess liability for one or more drivers of the one or more vehicles involved in the vehicle crash based on the fault characteristics; and cause, via the communication network, indications of the assessed liabilities for the one or more drivers to be displayed on a user interface.

11. The system of claim 10, wherein to cause indications of the assessed liabilities for the one or more drivers to be displayed on a user interface, the instructions cause the system to:

cause, via the communication network, indications of percentages of fault allocated to each of the drivers to be displayed on the user interface based on the assessed liability for each of the drivers; and cause, via the communication network, an indication of a total amount of damage caused by the vehicle crash to be displayed on the user interface based on the analysis of the compilation.

12. The system of claim 11, wherein to analyze the compilation to determine one or more fault characteristics of the vehicle crash, the instructions cause the system to:

analyze the compilation to identify one or more injuries to vehicle occupants or pedestrians involved in the vehicle crash and to determine an extent of each of the injuries.

13. The system of claim 12, wherein the plurality of sets of video images are received in at least near real-time as the vehicle crash occurs; and when the extent of at least one of the injuries exceeds a predetermined threshold, the instructions cause the system to transmit, via the communication network, an alert to emergency personnel including a request to receive an ambulance at the location of the vehicle crash.

14. The system of claim 13, wherein the alert further includes an indication of a type of the injuries based on the compilation.

15. The system of claim 11, wherein to analyze the compilation to determine one or more fault characteristics of the vehicle crash, the instructions further cause the system to, for a first vehicle:

analyze the compilation to determine a distance between the first vehicle and a second vehicle in front of the first vehicle within the predetermined threshold time from the time of the vehicle crash;

analyze the compilation to determine a speed of the first vehicle when the first vehicle is at the distance from the second vehicle;

compare the distance to a minimum stopping distance for the speed of the first vehicle; and when the distance is less than the minimum stopping distance, determine that a driver of the first vehicle is at fault for a rear end collision with the second vehicle.

16. The system of claim 10, wherein to receive a plurality of sets of video images from one or more image capturing devices, the instructions further cause the system to:

receive, via the communication network, a plurality of sets of video images from a plurality of the image capturing devices for the area within the predetermined threshold distance of the location of the vehicle crash and within the predetermined threshold time from the time of the vehicle crash, wherein each of the plurality of video images depicts at least one of the one or more vehicles involved in the vehicle crash.

17. The system of claim 10, wherein the one or more image capturing devices includes at least one of: (i) a public surveillance camera; (ii) a satellite; (iii) a plurality of mobile devices; or (iv) a camera removably mounted on a monopod which is externally attached to one of the one or more vehicles.

* * * * *